(12) United States Patent
Grossman et al.

(10) Patent No.: US 11,562,472 B2
(45) Date of Patent: Jan. 24, 2023

(54) SYSTEM OF TREAD DEPTH ESTIMATION AND METHOD THEREOF

(71) Applicants: Danny Grossman, Herzliya (IL); Roman Shklyar, Holon (IL); Ilya Grinshpoun, Ramat-Gan (IL)

(72) Inventors: Danny Grossman, Herzliya (IL); Roman Shklyar, Holon (IL); Ilya Grinshpoun, Ramat-Gan (IL)

(73) Assignee: UVEYE LTD., Tel Aviv (IL)

( * ) Notice: Subject to any disclaimer, the term of this patent is extended or adjusted under 35 U.S.C. 154(b) by 295 days.

(21) Appl. No.: 17/039,793

(22) Filed: Sep. 30, 2020

(65) Prior Publication Data

US 2022/0101512 A1    Mar. 31, 2022

(51) Int. Cl.
| | |
|---|---|
| G06T 7/60 | (2017.01) |
| B60C 11/24 | (2006.01) |
| G06T 7/00 | (2017.01) |
| G01M 17/02 | (2006.01) |
| G01B 11/22 | (2006.01) |
| G06T 7/11 | (2017.01) |
| H04N 5/225 | (2006.01) |
| G06T 7/507 | (2017.01) |

(52) U.S. Cl.
CPC .......... *G06T 7/0004* (2013.01); *B60C 11/246* (2013.01); *G01B 11/22* (2013.01); *G01M 17/027* (2013.01); *G06T 7/11* (2017.01); *G06T 7/507* (2017.01); *G06T 7/60* (2013.01); *H04N 5/2256* (2013.01); *G06T 2207/20021* (2013.01); *G06T 2207/30108* (2013.01)

(58) Field of Classification Search
CPC ......... G06T 7/0004; G06T 7/11; G06T 7/507; G06T 7/60; G06T 2207/20021; G06T 2207/30108; G06T 2207/20084; B60C 11/246; B60C 11/24; G01B 11/22; G01M 17/027; H04N 5/2256
USPC ....... 382/100, 141, 106, 108, 149, 151, 154, 382/155, 173, 174, 181, 297, 298, 312
See application file for complete search history.

(56) References Cited

U.S. PATENT DOCUMENTS

| | | | |
|---|---|---|---|
| 9,677,973 B1* | 6/2017 | Carroll | ................... G01D 11/26 |
| 9,805,697 B1* | 10/2017 | Dorrance | ............. H04N 13/204 |

(Continued)

FOREIGN PATENT DOCUMENTS

WO    2020086698 A1    4/2020

*Primary Examiner* — Sheela C Chawan
(74) *Attorney, Agent, or Firm* — Browdy and Neimark, PLLC

(57) ABSTRACT

A method and system are provided for estimating tire tread depth, the method comprising: obtaining an image of the tire informative of tread and grooves embedded therein, wherein the image is acquired by an imaging device from a first angle relative to a horizontal direction perpendicular to tread surface, and the tire is illuminated by an illumination device from a second angle relative to the horizontal direction, causing a shadow section and an illuminated section at the bottom and/or sidewall of a groove, the first angle being smaller than the second angle, such that the image captures the illuminated section and at least part of the shadow section; performing segmentation on the image to obtain image segments corresponding to the illuminated section and the at least part of the shadow section; and estimating the tread depth based on the image segments, the groove width, and the second angle.

20 Claims, 10 Drawing Sheets

(56) References Cited

U.S. PATENT DOCUMENTS

| | | | |
|---|---|---|---|
| 2014/0002641 A1* | 1/2014 | Takahashi | G01B 11/25 348/135 |
| 2015/0002847 A1* | 1/2015 | Sukegawa | G01B 11/24 356/445 |
| 2015/0330773 A1* | 11/2015 | Uffenkamp | G01B 11/25 356/631 |
| 2016/0258842 A1* | 9/2016 | Taylor | G01B 11/22 |
| 2017/0160079 A1* | 6/2017 | Takebuchi | G01B 11/24 |
| 2018/0299352 A1 | 10/2018 | Rose et al. | |
| 2019/0084355 A1* | 3/2019 | McPillan | B60C 11/246 |
| 2022/0099530 A1* | 3/2022 | Honda | G01B 11/24 |

* cited by examiner

SYSTEM OF TREAD DEPTH ESTIMATION AND METHOD THEREOF

TECHNICAL FIELD

The presently disclosed subject matter relates, in general, to the field of tire inspection, and more specifically, to methods and systems for tread depth estimation.

BACKGROUND

Tires are critical components of a vehicle, since they are the only parts of the vehicle that have direct contact with the road. Tires can affect vehicle handling and safety due to their functions of supporting vehicle load, transmitting traction and braking forces to the road surface, absorbing road shocks, and changing and maintaining the direction of travel. For optimum performance, tires must have correct air pressure, tread depth, balance, etc., and the wheels of the vehicle must be properly installed and maintained. Thus for at least safety and economy reasons, tires have to be inspected on a regular basis.

The tread of a tire refers to the rubber on its circumference that makes contact with the road or the ground. The tread is a crucial piece of the tire, whose importance ranges all the way from safety to economy. It gives the tire its ability to grip the road, and even help maximize fuel economy.

As tires are used, the tread is gradually worn off, limiting its effectiveness in providing traction. Thus, over time, tires become less effective at gripping the road. In some cases, if a tread has worn down too far, it could become a serious safety issue. Tire grooves are designed to allow water to be expelled from beneath the tire and prevent hydroplaning. Shallow tread grooves also make it harder to control the vehicle in wet weather and the chance of hydroplaning increases.

Current inspection of tires for wear and damages is normally performed manually at an inspection station. For example, tread depth, which is a vertical measurement from the top of the tire's rubber to the bottom of the tire's grooves, can be obtained as an important indicator of the tire's condition. A tire tread depth gauge is often used to measure the tread depth by inserting a probe bar into the groove and pushing the shoulders flush with the tread. Measurement of the depth can be read from the top of the gauge. However, such manual inspection is not only costly and time consuming, but also prone to inspection errors and variations caused by specific personnel performing the inspection.

Although certain aspects of tire inspection have been partially automated with the development of computer technologies, there is still a need for an inspection system which can automatically provide accurate information regarding the condition of the tread.

GENERAL DESCRIPTION

In accordance with certain aspects of the presently disclosed subject matter, there is provided a computerized system of estimating tread depth of a tire, the system comprising a processing and memory circuitry (PMC) configured for: obtaining, from an imaging device, an image of the tire positioned on an inspection lane, the image informative of tread of the tire and one or more grooves embedded therein, wherein the imaging device is positioned on at least one side of the inspection lane, and the image is acquired by the imaging device from a first angle relative to a horizontal direction perpendicular to surface of the tread, and wherein the tire is illuminated by an illumination device from a second angle relative to the horizontal direction, causing a shadow section and an illuminated section at the bottom and/or sidewall of at least one groove, wherein the imaging device and the illumination device are positioned so as to have the first angle being smaller than the second angle, such that the image captures the illuminated section and at least part of the shadow section: performing segmentation on the image to obtain at least a first image segment corresponding to the illuminated section and a second image segment corresponding to the at least part of the shadow section: obtaining a groove width of the at least one groove: and estimating the tread depth based on at least the first image segment, the groove width, and the second angle.

In addition to the above features, the system according to this aspect of the presently disclosed subject matter can comprise one or more of features (i) to (xi) listed below, in any desired combination or permutation which is technically possible:

(i). The first image segment indicates that the illuminated section falls entirely on the sidewall of the at least one groove, and the estimating comprises determining a range of the tread depth based on the groove width and the second angle.

(ii). The first image segment comprises a first sub-segment corresponding to a first sub-section of the illuminated section that falls on the bottom of the at least one groove and a second sub-segment corresponding to a second sub-section of the illuminated section that falls on the sidewall of the at least one groove, and the estimating comprises: measuring a width of the first sub-segment; calculating a width of the shadow section using the width of the first sub-segment and the groove width; and estimating the tread depth of the tire using the width of the shadow section and the second angle.

(iii). The system further comprises the imaging device and the illumination device which are positioned in proximity to each other on the at least one side of the inspection lane, and at least the imaging device is operatively connected to the PMC.

(iv). The second angle is configured to adapt to different tire characteristics including different groove widths and/or tire locations on the inspection lane so as to provide estimation for tread depth in a predefined depth range for different tires.

(v). The PMC is further configured for comparing the tread depth with a predefined criterion and determining whether to replace the tire.

(vi). The segmentation is performed using a segmentation learning model trained to segment a tire image in accordance with different illumination levels.

(vii). The image is further informative of one or more tread wear bars, and the PMC is further configured for estimating depth of at least one of the tread wear bars.

(viii). The image is informative of one or more tires, and the PMC is configured for extracting one or more sub-images corresponding to the one or more tires, and performing the segmentation and the estimation on each of the one or more sub-images.

(ix). The tire is a rotating tire on a moving vehicle, and the PMC is configured for obtaining a sequence of images of the tire during a relative movement between the tire and the imaging device, and performing the segmentation and the estimation on at least some of the sequence of images so as to obtain estimated tread depth covering at least part of circumference of the tire.

(x). The image is split into a plurality of image patches corresponding to a plurality of measurement locations on the at least one groove. The PMC is configured for performing the segmentation and estimation using the second angle for a first image patch that is on a horizontal plane with respect to the illumination device, the imaging device and center of the tire. For at least a second image patch that is above or below the horizontal plane, the PMC is configured for obtaining a 3D second angle corresponding to a measurement location in the second image patch, and performing the segmentation and estimation on the second image patch using the 3D second angle.

(xi). The 3D second angle is obtained by performing a correction on the second angle based on a relative position of the measurement location with respect to the horizontal plane, and radius of the tire.

In accordance with other aspects of the presently disclosed subject matter, there is provided a computerized method of estimating tread depth of a tire, the method performed by a processor and memory circuitry (PMC) and comprising: obtaining, from an imaging device, an image of the tire positioned on an inspection lane, the image informative of tread of the tire and one or more grooves embedded therein, wherein the imaging device is positioned on at least one side of the inspection lane, and the image is acquired by the imaging device from a first angle relative to a horizontal direction perpendicular to surface of the tread, and wherein the tire is illuminated by an illumination device from a second angle relative to the horizontal direction, causing a shadow section and an illuminated section at the bottom and/or sidewall of at least one groove, wherein the imaging device and the illumination device are positioned so as to have the first angle being smaller than the second angle, such that the image captures the illuminated section and at least part of the shadow section; performing segmentation on the image to obtain at least a first image segment corresponding to the illuminated section and a second image segment corresponding to the at least part of the shadow section; obtaining a groove width of the at least one groove; and estimating the tread depth based on at least the first image segment, the groove width and the second angle.

This aspect of the disclosed subject matter can comprise one or more of features (i) to (xi) listed above with respect to the system, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform a method of estimating tread depth of a tire, the method comprising: obtaining, from an imaging device, an image of the tire positioned on an inspection lane, the image informative of tread of the tire and one or more grooves embedded therein, wherein the imaging device is positioned on at least one side of the inspection lane, and the image is acquired by the imaging device from a first angle relative to a horizontal direction perpendicular to surface of the tread, and wherein the tire is illuminated by an illumination device from a second angle relative to the horizontal direction, causing a shadow section and an illuminated section at the bottom and/or sidewall of at least one groove, wherein the imaging device and the illumination device are positioned so as to have the first angle being smaller than the second angle, such that the image captures the illuminated section and at least part of the shadow section; performing segmentation on the image to obtain at least a first image segment corresponding to the illuminated section and a second image segment corresponding to the at least part of the shadow section; obtaining a groove width of the at least one groove; and estimating the tread depth based on at least the first image segment, the groove width and the second angle.

This aspect of the disclosed subject matter can comprise one or more of features (i) to (xi) listed above with respect to the system, mutatis mutandis, in any desired combination or permutation which is technically possible.

BRIEF DESCRIPTION OF THE DRAWINGS

In order to understand the present disclosure and to see how it may be carried out in practice, embodiments will now be described, by way of non-limiting example only, with reference to the accompanying drawings, in which.

DETAILED DESCRIPTION OF EMBODIMENTS

Figure 1A:
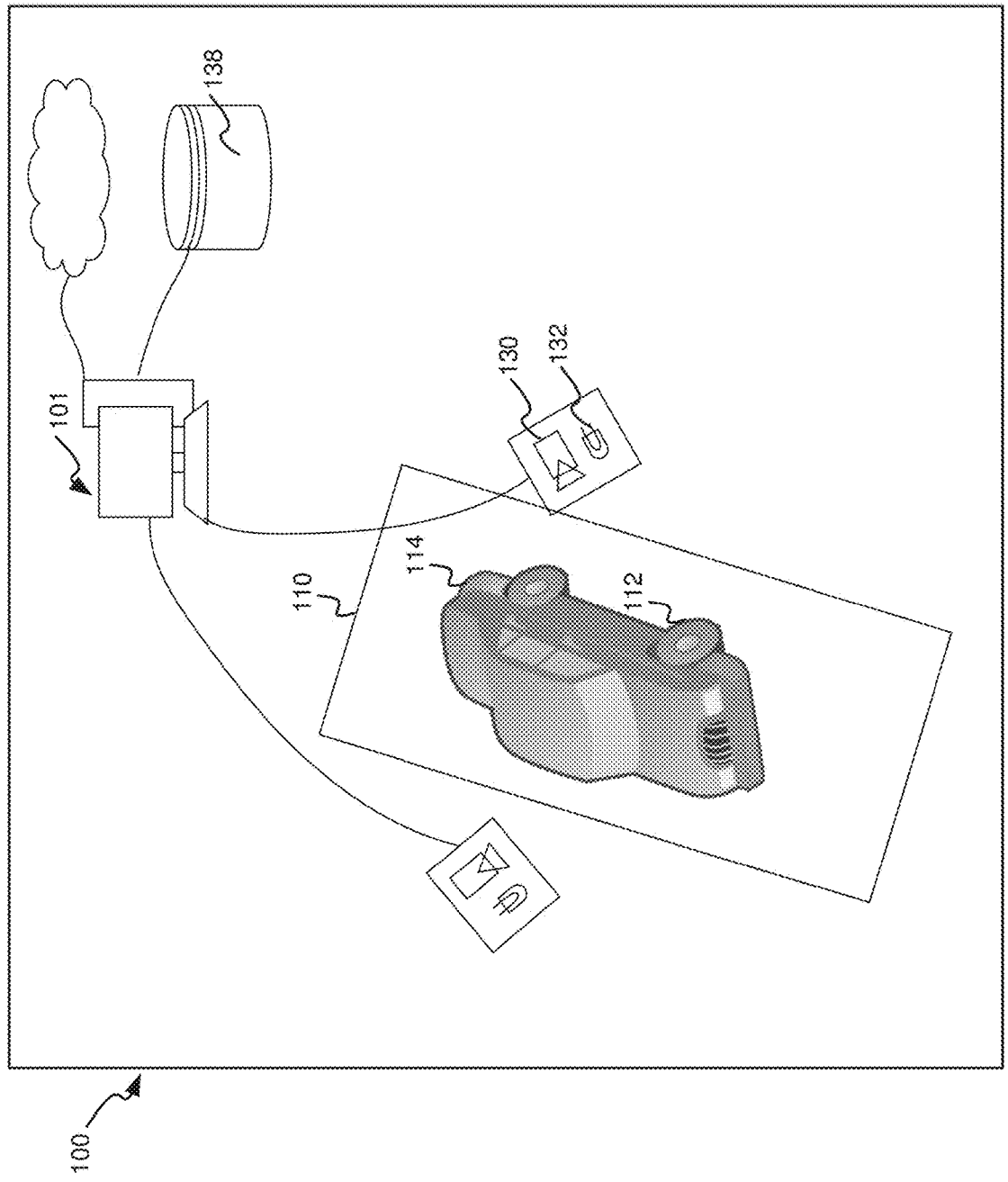
FIG. 1A schematically illustrates a functional block diagram of a tire inspection system in accordance with certain embodiments of the presently disclosed subject matter.

In the following detailed description, numerous specific details are set forth in order to provide a thorough understanding of the present disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "capturing", "performing", "estimating", "segmenting", "measuring", "calculating", "comparing", "extracting", "inspecting", "selecting", "using", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the tire inspection system, the tread depth estimation system and parts thereof disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases". "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter one or more stages illustrated in the figures may be executed in a different order and/or one or more groups of stages may be executed simultaneously and vice versa.

Bearing this in mind, attention is drawn to FIG. 1A, schematically illustrating a functional block diagram of a tire inspection system in accordance with certain embodiments of the presently disclosed subject matter.

The system 100 illustrated in FIG. 1A is a computer-based tire inspection system for automatically inspecting one or more tires (also referred to herein as tire(s) to be inspected) of a vehicle. Tires are used on many types of vehicles, including but not limited to cars, bicycles, motorcycles, buses, trucks, heavy equipment, and aircraft, etc., and the present disclosure is not limited to inspecting tires of a specific type of vehicles.

System 100 comprises a computerized system 101 configured for automatic tread depth estimation, and at least one set of imaging acquisition device 130 (also termed herein as imaging device) and illumination device 132. Specifically, system 101 can be configured to obtain, from the imaging device 130, one or more images of at least one tire 112 positioned on an inspection lane 110, and automatically estimating tread depth of the tire based on the captured image(s). In some cases, the tire to be inspected can be associated with a vehicle 114 that is positioned on the inspection lane or passing through the inspection lane. In some other cases, the tire to be inspected can be a stand-alone tire.

As aforementioned, the tread of a tire (also referred to as tire tread or just tread) refers to the rubber on the tire's circumference that makes contact with the ground. The grooves that are embedded or molded into the rubber, form the tread pattern. The grooves are designed to allow water to be expelled from beneath the tire and prevent hydroplaning. As tires are used, the tread is worn off, limiting its effectiveness in providing traction, and the vehicle can suffer from extended braking distances. Shallow tread grooves also make it harder to control the vehicle in wet weather, and the chance of hydroplaning increases. To assess tread wear condition, tread depth can be estimated and provided as a direct indication of the tire's condition.

The term "tread depth", as used herein, refers to the depth of the grooves (patterns) on the tire tread. It is a vertical measurement from the top of the tire's rubber (i.e., the surface of the tread) to the bottom of the tire's grooves. Tread depth can be measured on several positions along the width of the tire. New tires typically have an average tread depth of 8 to 9 millimeters (10/32 to 11/32 inches). Different countries may have different legal limits and requirements for tread depth. For instance, most states and tire manufacturers in the United States consider tires to be bald when one or more of their grooves are worn down to 1.6 millimeters (2/32 inches), which must be replaced. For safety reasons, in some cases it is recommended to have a minimum tread depth of 3 millimeters for summer tires, and at least 4 millimeters (5/32 inches) for winter tires.

Continuing with the description of FIG. 1A, the imaging device 130 can be located (e.g., mounted or otherwise situated) on at least one side of the tire 112 (e.g., on at least one side of the inspection lane 110) and configured to acquire one or more images of a tire. According to certain embodiments, the imaging device 130 is positioned/oriented to face the tire from a first angle relative to a horizontal direction perpendicular to the surface of the tire tread, and the one or more images are acquired by the imaging device from the first angle. An image acquired by the imaging device 130 can be informative of the tire tread and one or more grooves embedded therein, as described above. The imaging device 130 can be operatively connected to system 101 and the captured image(s) can be transmitted to system 101 for processing via wired or wireless communication.

It is to be noted that the imaging device used herein can refer to any kind of image acquisition devices or general-purpose devices equipped with image acquisition functionalities that can be used to capture tire images at a certain resolution and/or frequency, such as, e.g., a digital camera with image and/or video recording functionalities.

The illumination device 132 is located in close proximity to the imaging device 130 (e.g., positioned on the same side of the tire as the imaging device) and is configured to provide illumination covering the Field of View (FOV) of the imaging device so as to enable images to be captured at relative high resolution and quality. In some cases, the imaging device and/or the illumination device can be attached to a supporting structure, such as one pole positioned on at least one side of the inspection lane. The imaging device and/or the illumination device can be attached to the supporting structure at an appropriate height and/or angle in relation to the tire to be inspected.

Specifically, in some embodiments, the imaging device 130 is positioned/oriented to face the tire from a first angle (also referred to as the imaging angle) relative to a horizontal direction perpendicular to the surface of the tire tread, and the illumination device is positioned/oriented to illuminate the tire from a second angle (also referred to as illumination angle) relative to the horizontal direction, causing a shadow section and an illuminated section at the bottom and/or the sidewall of at least one groove. The imaging device and the illumination device are positioned so as to have the first angle being smaller than the second angle, such that the image captures the illuminated section and at least part of the shadow section, as will be described in further detail below with reference to FIG. 4.

In some embodiments, there can be a set of imaging device and illumination device located on both sides of the inspection lane (as exemplified in FIG. 1A), such that tire images from both sides of the vehicle can be simultaneously acquired and processed. In some cases, the vehicle 114 can be a moving vehicle which passes through the inspection lane and the tires to be inspected are rotating tires of the moving vehicle. In some other cases, the tires to be inspected are stationary tires, either stand-alone on the inspection lane, or associated with a stationary vehicle. In cases where the tire to be inspected is a rotating tire of a moving vehicle, the image acquisition and/or the illumination can be triggered by an external sensing device which can detect the presence/approach of the vehicle (such as, e.g., road loop, Infra-red (IR) beam, VMD, etc.).

System 101 can be operatively connected to the imaging device 130, and in some cases also to the illumination device, and can be used for controlling the devices (e.g., synchronizing the image acquisition and illumination operation), calibrating the system during a set-up stage, and processing the acquired images of the tire so as to estimate tread depth in runtime. In some cases, system 101 can be operatively connected to one or more external data repositories 138.

Figure 1B:
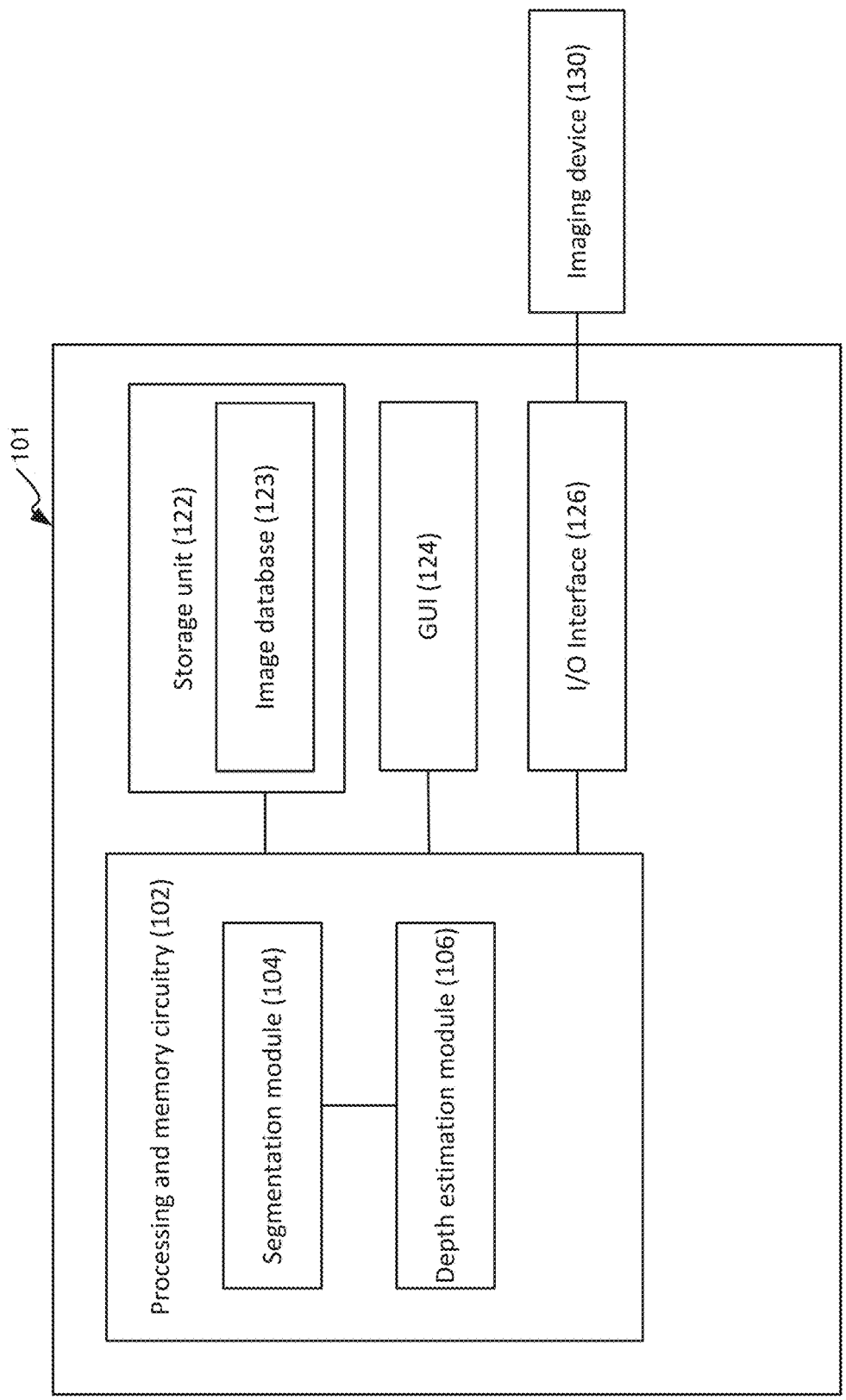
FIG. 1B schematically illustrates a generalized block diagram of a computerized system of tread depth estimation with certain embodiments of the presently disclosed subject matter.

Referring now to FIG. 1B, there is schematically illustrated a generalized block diagram of a computerized system of tread depth estimation with certain embodiments of the presently disclosed subject matter.

System 101 can comprise a processing and memory circuitry (PMC) 102 operatively connected to a hardware-based I/O interface 126 and a storage unit 122. PMC 102 is configured to provide necessary processing for operating system 101 which is further detailed with reference to FIGS. 2-3. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein should be expansively construed to cover any processing circuitry with data processing capabilities, and the present disclosure is not limited to the type or platform thereof, or number of processing cores comprised therein.

According to certain embodiments, functional modules comprised in the PMC 102 can comprise a segmentation module 104 and a depth estimation module 106 which are operatively connected with each other. The PMC is configured to obtain (e.g., via the hardware-based I/O interface 126), from the imaging device 130, an image of the tire to be inspected. The image is informative of tread of the tire and one or more grooves embedded therein. As aforementioned, the imaging device and the illumination device are positioned in a specific relative position such that the image acquired by the imaging device captures the illuminated section and at least part of the shadow section at the bottom and/or sidewall of at least one groove. The segmentation module 104 can be configured to perform segmentation on the image to obtain at least a first image segment corresponding to the illuminated section, and a second image segment corresponding to the at least part of the shadow section. The depth estimation module 106 can be configured to obtain a groove width of the at least one groove and estimate the tread depth based on at least the first image segment, the groove width, and the second angle. Details of the processing by these functional modules are described below with reference to FIGS. 2 and 3.

The storage unit 122 can include an image database 123 which can be configured to store the acquired image(s) of one or more tires to be inspected. In some cases, these images can be pre-acquired from the imaging devices 130 and stored in the image database 123 to be retrieved and processed by the PMC. The storage unit 122 can also be configured to store any of the intermediate processing results, such as, e.g., image segments, measurements, etc. Optionally, the image database 123 can reside external to system 101, e.g., in one of the external data repositories, or in an external system or provider, and the images can be retrieved via the I/O interface 126.

The I/O interface 126 can be configured to obtain, as input, the acquired images from the imaging devices and/or the image database, and provide, as output, the estimated tread depth. Optionally, system 101 can further comprise a graphical user interface (GUI) 124 configured to render display of the input and/or the output to the user. Optionally, the GUI can be configured to enable user-specified inputs for operating system 101.

In some cases, system 101 can be operatively connected to one or more external data repositories 138 which can be local or remote (e.g., cloud-based). The acquired images and/or the results of the run-time image processing can be saved in the storage unit 122 and/or the external data repositories 138.

It is also noted that the system illustrated in FIGS. 1A and/or 1B can be implemented in a distributed computing environment. By way of example, some of the functional modules shown in FIG. 1B can be distributed over several local and/or remote devices, and can be linked through a communication network. By way of another example, system 101 can be located at a different location from the imaging devices.

Those versed in the art will readily appreciate that the teachings of the presently disclosed subject matter are not bound by the systems illustrated in FIGS. 1A and 1B; equivalent and/or modified functionality can be consolidated or divided in another manner and can be implemented in any appropriate combination of software with firmware and hardware. The systems in FIGS. 1A and 1B can be stand-alone network entities, or integrated, fully or partly, with other network entities. Those skilled in the art will also readily appreciate that the data repositories or storage unit therein can be shared with other systems or be provided by other systems, including third party equipment.

Figure 2:
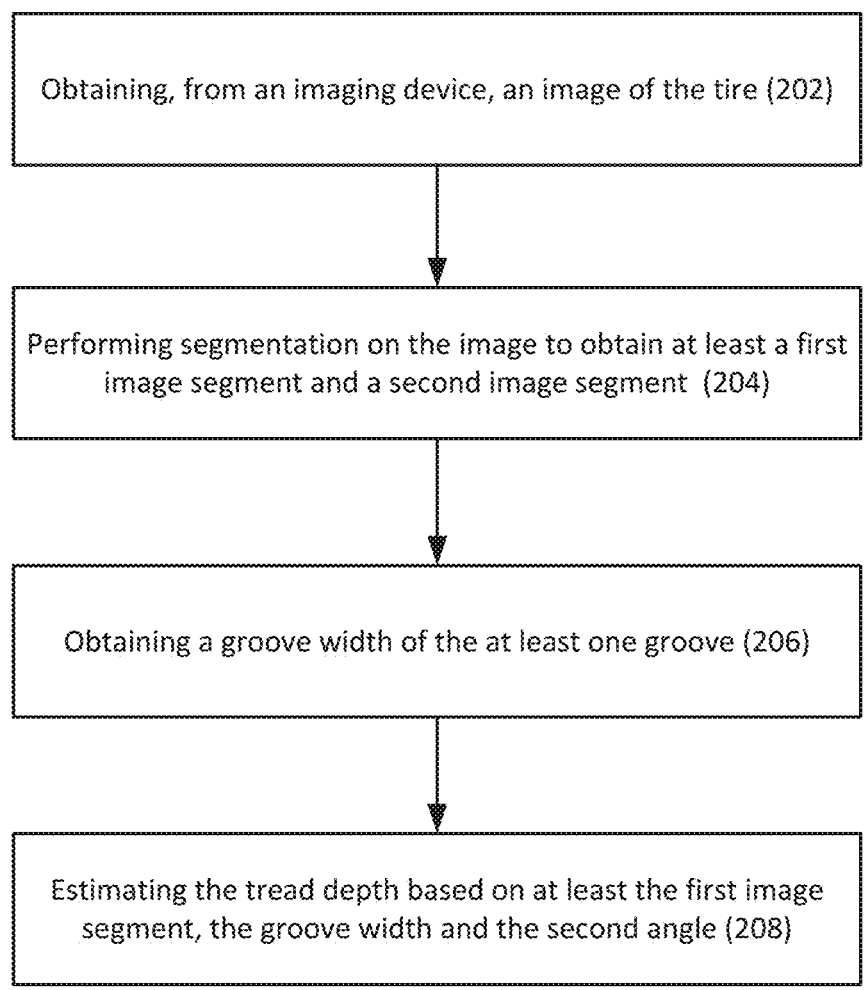
FIG. 2 illustrates a generalized flowchart of tread depth estimation in accordance with certain embodiments of the presently disclosed subject matter.
Figure 3:
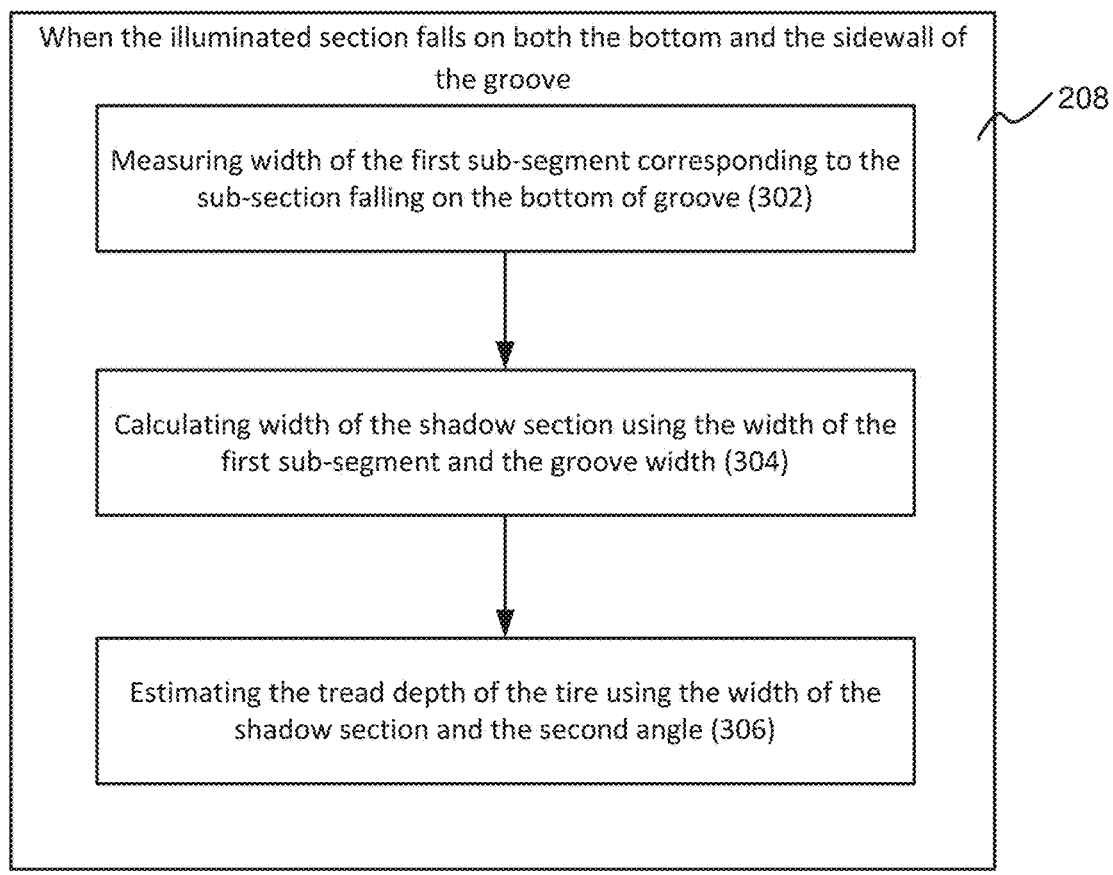
FIG. 3 illustrates a generalized flowchart of tread depth estimation in cases where the illuminated section falls on both the bottom and the sidewall of the groove, in accordance with certain embodiments of the presently disclosed subject matter.
Figure 3:
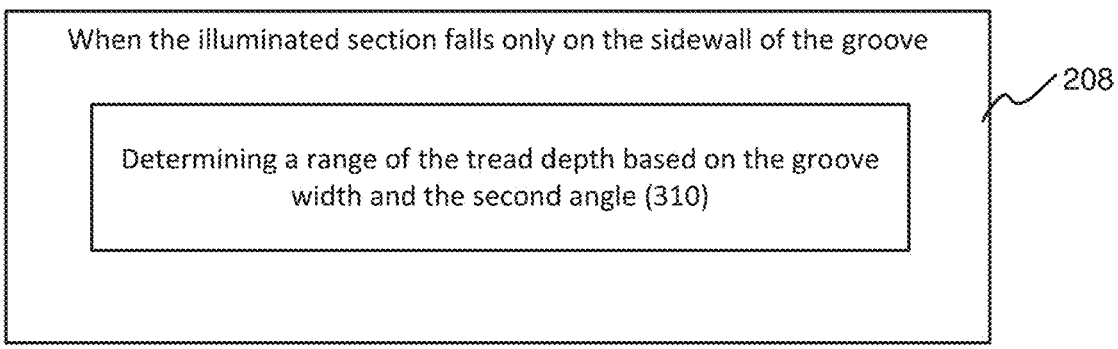

While not necessarily so, the process of operation of system 101 can correspond to some or all of the stages of the methods described with respect to FIGS. 2 and 3. Likewise, the methods described with respect to FIGS. 2 and 3 and their possible implementations can be implemented by system 101. It is therefore noted that embodiments discussed in relation to the methods described with respect to FIGS. 2 and 3 can also be implemented, mutatis mutandis as various embodiments of the system 101, and vice versa.

Referring now to FIG. 2, there is illustrated a generalized flowchart of tread depth estimation in accordance with certain embodiments of the presently disclosed subject matter.

At least one image of a tire (i.e., a tire to be inspected as positioned on an inspection lane), acquired by an imaging device, can be obtained (202) (e.g., by the PMC 102 via I/O interface 126, or from the storage unit 122, as illustrated in FIG. 1B).

The at least one image used herein can refer to either i) one or more original/raw images captured by any kind of image acquisition device(s) in any suitable format, or ii) one or more processed images generated after performing certain image processing procedures on the original images. In some cases, the original images acquired by the imaging device can capture a larger portion of the vehicle which contains not only the tire but also other components of the vehicle. In such cases, the original image may need to be segmented and/or cropped so as to obtain a processed tire image containing the tire. By way of example, in cases where the tire is a rotating tire of a moving vehicle, the segmentation can be performed by estimating movement of pixels between two consecutive frames, and separating pixels in circular movement (i.e., the wheel pixels) from pixels in horizontal movement.

According to certain embodiments, a plurality of tires of a vehicle are to be inspected. In such cases, for each of the tires, one or more images can be captured. In cases where the vehicle is a moving vehicle, by way of example, an imaging device can capture multiple images of a tire at a given capture rate (e.g., 100-250 frames per second) when the vehicle is passing through an inspection lane. In some cases, at least one image of the multiple captured images may be selected and directly used for further processing. In some other cases, the multiple images with overlapping field of view can be combined together to form a single stitched image of the tire. Such a stitched image, which typically has a relatively high resolution, can be used for further processing.

For purpose of simplicity and exemplification, certain embodiments of the present disclosure are described with reference to tread depth estimation based on one image of a tire. However, this is not intended to limit the present disclosure in any way, and the estimation method as disclosed herein can be applied to multiple images of a tire, or one or more images of one or more tires of a vehicle in a similar manner.

Figure 5:
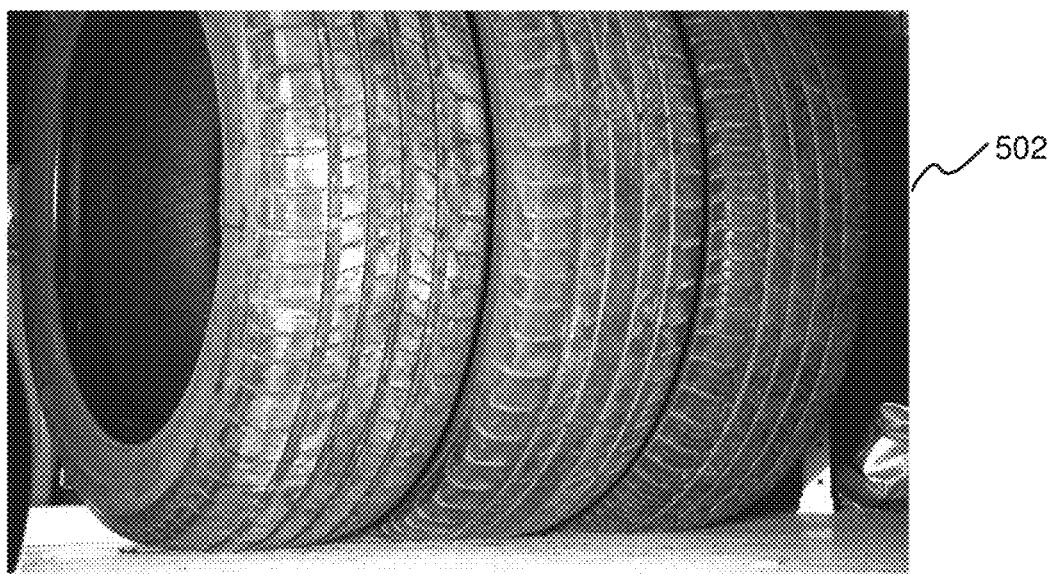
FIG. 5 illustrates two examples of tire images in accordance with certain embodiments of the presently disclosed subject matter.
Figure 5:

As aforementioned, the acquired image captures a tire to be inspected and is informative of tread of the tire and one or more grooves embedded therein. FIG. 5 illustrates two examples of tire images in accordance with certain embodiments of the presently disclosed subject matter. As illustrated, 502 is an original image as acquired by the imaging device, comprising image representation of three tires of a vehicle, while 504 is a processed tire image which is scaled and/or cropped based on an original image, and comprises an image patch representing a part/slice of the tire. As shown, the images 502 and 504 are informative of tread of the tire and one or more grooves embedded therein.

The tire images are acquired with a specific system configuration with respect to the imaging device and the illumination device, as described above with reference to FIG. 1A. Specifically, the imaging device is positioned on at least one side of the inspection lane, and the image is acquired by the imaging device from a first angle relative to a horizontal direction perpendicular to surface of the tread. The tire is illuminated by an illumination device from a second angle relative to the horizontal direction, causing a shadow section and an illuminated section at the bottom and/or the sidewall of at least one groove. The imaging device and the illumination device are positioned in a specific relative position so as to have the first angle being smaller than the second angle, such that the image can capture the illuminated section and at least part of the shadow section.

Figure 4:
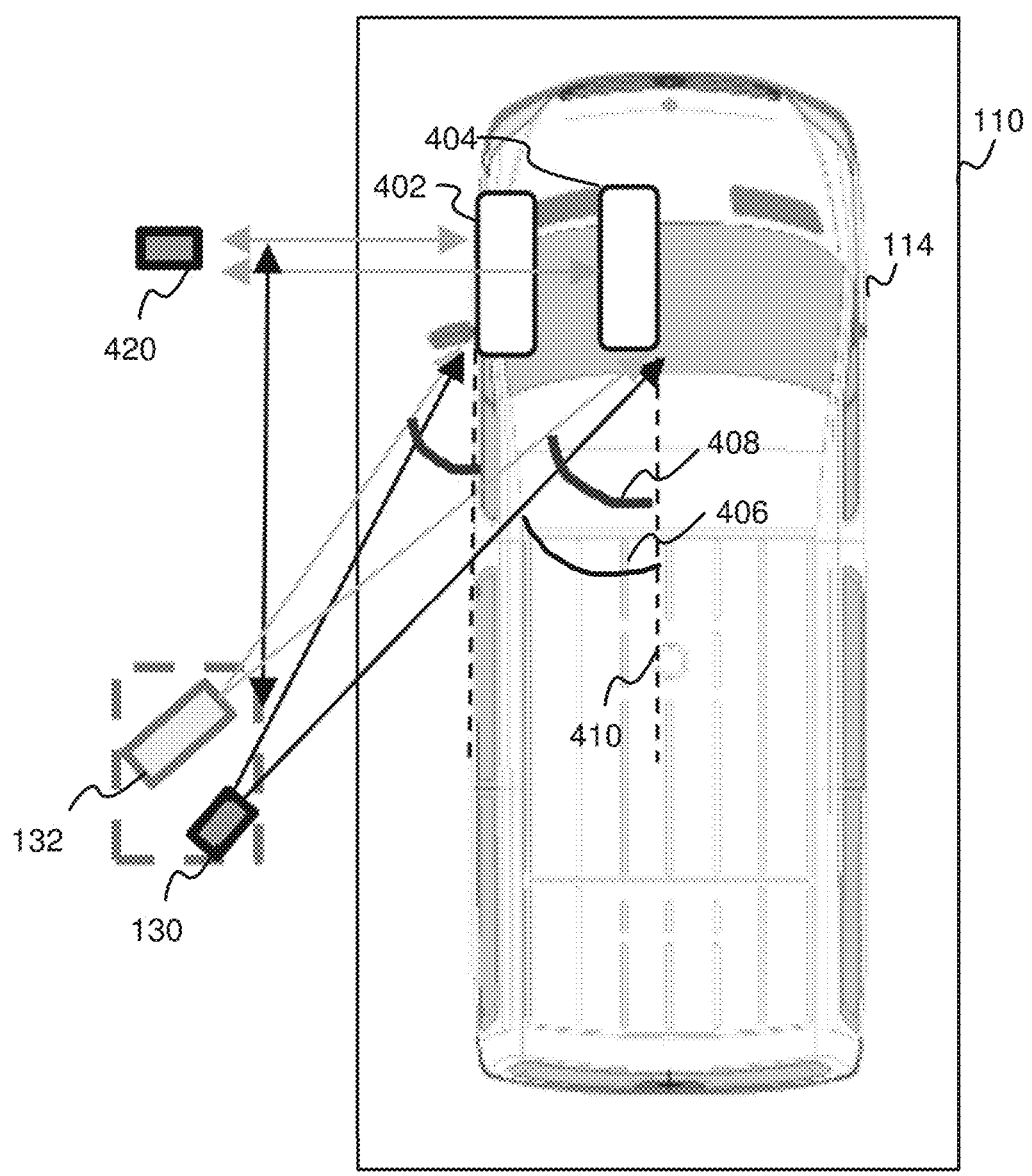
FIG. 4 is a schematic illustration of system configuration of the imaging device and the illumination device with respect to the tire in accordance with certain embodiments of the presently disclosed subject matter.

Referring now to FIG. 4, there is a schematic illustration of system configuration of the imaging device and the illumination device with respect to the tire in accordance with certain embodiments of the presently disclosed subject matter.

Continuing with the example of FIG. 1A, a vehicle 114 is positioned on the inspection lane 110, and two tires 402 and 404 of the vehicle that are to be inspected are illustrated. As aforementioned, the vehicle 114 can be a moving vehicle passing through the inspection lane, or a stationary vehicle parked on the inspection lane. The imaging device 130 and the illumination device 132 are located at one side of the inspection lane, in proximity to each other. Taking the tire 404 for example, the imaging device 130 is oriented to acquire the image from a first angle 406 relative to a horizontal direction 410 perpendicular to the surface of the tire tread. The horizontal direction 410 refers to being horizontal to the ground of the inspection lane. In this specific example, the direction 410 can also be understood as being parallel to the traveling direction of the vehicle, or parallel to the longitudinal axis of the vehicle. Similarly, the illumination device 132 is oriented to illuminate the tire 404 from a second angle 408 relative to the horizontal direction 410. As illustrated, it is specifically designed by the present disclosure that the first angle 406 is smaller than the second angle 408, i.e., the imaging device 130 is positioned relatively closer to the tire/inspection lane as compared to the illumination device 132.

Since the illumination device 132 is shedding light from the side of the tire, and the tread blocks part of the light, it naturally causes a shadow section and an illuminated section at the bottom and/or the sidewall of the groove of the tire. Since the imaging device is positioned with a smaller angle with respect to the tire as compared to the illumination device, the image as acquired can capture the entire illuminated section and at least part of the shadow section.

Figure 6A:
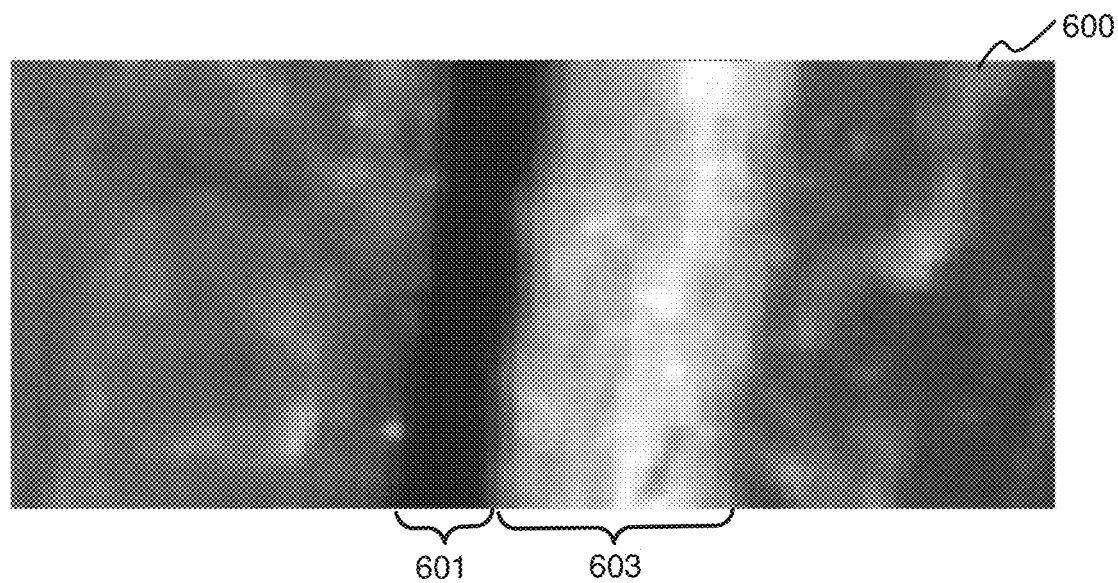
FIG. 6A illustrates an example of an image patch from a tire image showing a shadow section and an illuminated section in accordance with certain embodiments of the presently disclosed subject matter.

FIG. 6A illustrates an example of an image patch from a tire image showing a shadow section and an illuminated section in accordance with certain embodiments of the presently disclosed subject matter. In the present example of image 600, the illuminated section 603 falls on both the bottom and the sidewall of a groove. The sidewall of a groove refers to the vertical area on the side of the groove, between the surface of the tread and the bottom of the groove. The shadow section 601 as captured in the image 600 is a part of the shadow section that is actually caused by the illumination device at the bottom of the groove, because of the relative position of the illumination device and the tire.

Continuing with the description of FIG. 2, image segmentation can be performed (204) (e.g., by the segmentation module 104 of the PMC 102) on the image to obtain image segments including at least a first image segment corresponding to the illuminated section (also referred to as illuminated segment) and a second image segment corresponding to the at least part of the shadow section (also referred to as shadow segment).

Image segmentation as referred to herein can be performed in various ways using different segmentation methodologies, such as, e.g., thresholding, clustering, edge detection, blob analysis, classification, or any other suitable segmentation methods, and the present disclosure is not limited by a specific segmentation method used herein. In some embodiments, the image segmentation can be performed using machine learning. By way of example, the segmentation can be implemented using a segmentation learning model, such as, e.g., a deep learning neural network (also referred to as deep neural network, or DNN). The segmentation deep learning model can be deemed as being comprised in the Segmentation module 104 of PMC 102.

DNN as used herein can refer to supervised or unsupervised DNN comprising a plurality of layers organized in accordance with respective DNN architecture. By way of non-limiting example, the layers of DNN can be organized in accordance with Convolutional Neural Network (CNN) architecture. Recurrent Neural Network architecture, Recursive Neural Networks architecture, GAN architecture, or otherwise. Optionally, at least some of the layers can be organized in a plurality of DNN sub-networks. Each layer of DNN can include multiple basic computational elements (CE) typically referred to in the art as dimensions, neurons, or nodes.

In some embodiments, the segmentation deep learning model (e.g., the segmentation DNN) can be trained using a training dataset comprising a set of training tire images, each segmented and labeled according to different sections with different illumination levels, such as, e.g., the illuminated section, shadow section, tread surface section, etc. The training images and the labels corresponding to segments are provided to the segmentation DNN for training. The training process is to optimize the model so that it can correctly predict segmentation label (e.g., pixel-wise segmentation label) of a tire image. In some cases, different training datasets covering images of various types of tires (e.g., tires of different types of vehicles) need to be provided so as to train the model to be able segment different types of incoming tire images in runtime.

It is noted that the teachings of the presently disclosed subject matter are not bound by the specific segmentation method, or the specific type or structure of the machine learning model used to perform the segmentation.

According to certain embodiments, the partition of a tire image into different segments may vary, e.g., it is possible that certain segments can be further partitioned into sub-segments. By way of example, in cases where the illuminated section falls on both the bottom and the sidewall of the groove, the first image segment, corresponding to the illuminated section, can be further partitioned into two sub-segments: a first sub-segment corresponding to a first sub-section of the illuminated section that falls on the bottom of the at least one groove (also termed as the bottom illuminated section), and a second sub-segment corresponding to a second sub-section of the illuminated section that falls on the sidewall of the at least one groove (also termed as the sidewall illuminated section). The two sub-segments are separated by the corner line between the bottom and the sidewall of the groove. Such sub-segmentation can result from the segmentation performed by the segmentation DNN, i.e., the output of the segmentation DNN comprises the shadow segment and the two sub-segments in the illuminated segment. Alternatively, the sub-segmentation can be performed separately on the output of the DNN which comprises the shadow segment and the illuminated segment. By way of example, it can be performed based on the difference between the grayscale levels of the two sub-sections which results from different light reflection of the bottom and sidewall as relative to the illumination angle. By way of another example, it can be performed by detecting the corner line separating the two sub-sections. In some further cases, the sub-segmentation can be performed in any other segmentation methods as described above.

Figure 6B:
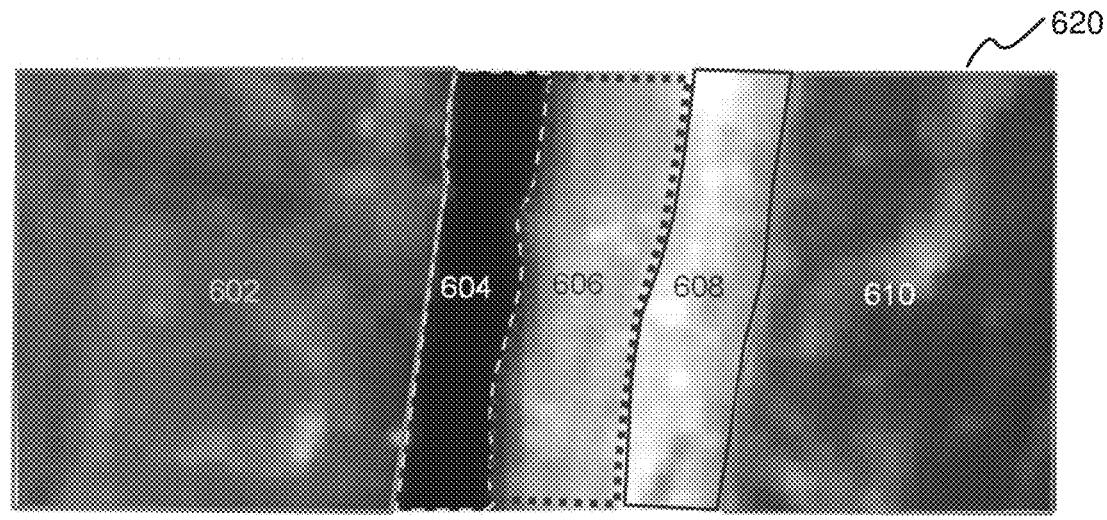
FIG. 6B illustrates an example of a segmented tire image in accordance with certain embodiments of the presently disclosed subject matter.

Referring now to FIG. 6B, there is illustrated an example of a segmented tire image in accordance with certain embodiments of the presently disclosed subject matter. As shown, the segmented tire image 620 corresponds to the tire image 600 as illustrated in FIG. 6A. The tire image 600 is segmented into multiple image segments 602, 604, 606, 608 and 610 as illustrated. The segmentation is performed such that the image segments represent different sections in the tire image. By way of example, the image segments 604, 606, and 608 respectively correspond to the shadow section 601, the first sub-section of the illuminated section 603 that falls on the bottom of the groove, and the second sub-section of the illuminated section 603 that falls on the sidewall of the groove. The image segments 606 and 608 are separated by the corner line between the bottom and the sidewall of the groove, and are two sub-segments corresponding to the illuminated section 603. In addition, the image segmentation also results in the image segments 602 and 610 which represent the tread sections next to the groove.

Continuing with the description of FIG. 2, a width of the at least one groove (also termed as groove width) can be obtained (206) and the tread depth can be estimated (208) (e.g., by the depth estimation module 106 of the PMC 102) based on at least the first image segment, the groove width, and the second angle.

According to certain embodiments of the presently disclosed subject matter, it is proposed by the present disclosure to use measurements of the shadow section and the illuminated section to estimate the tread depth. Specifically, if the width of the shadow section W can be obtained, the tread depth D can be estimated based on the width of the shadow section $W_{shadow}$ and the second angle $\theta$ (i.e., the illumination angle), e.g., by $D=W_{shadow}/\tan(\theta)$, as illustrated with reference to FIG. 7. However, it is to be understood that only if the imaging device is positioned directly along the horizontal/travelling direction, as illustrated in FIG. 4, thus facing the tire from a perpendicular direction, it could capture the entire shadow section, whose width can then be obtained from the image. However, in many cases, especially when the tire to be inspected is on a moving vehicle, it is not convenient, or nearly impossible, to place the imaging device in such a direction (without making changes to the facilities, such as digging the inspection lane and installing the imaging device underground).

In the present disclosure, the imaging device and the illumination device are positioned on the side of the inspection lane, and are arranged in a specific relative position as described above, thereby enabling the image acquired to capture at least part of the shadow section, thus ensuring the entire illumination section is captured in the image. In such a way, the width of the illuminated section can be obtained, and the width of the shadow section can be estimated by subtracting the width of the illuminated section from the entire width of the groove.

There are different scenarios of estimating tread depth, depending on the location of the illuminated section on the tire, which may differ due to factors such as, e.g., different tire types, groove width, tire ages, the illumination angle, the position of tires on the inspection lane as relative to the illumination device/imaging device, etc.

In some embodiments, when the illuminated section falls on both the bottom and the sidewall of the groove, as described above, the first image segment corresponding to the illuminated section actually comprises a first sub-segment corresponding to a first sub-section of the illuminated section that falls on the bottom of the at least one groove, and a second sub-segment corresponding to a second sub-section of the illuminated section that falls on the sidewall of the at least one groove. FIG. 3 illustrates a generalized flowchart of tread depth estimation in such cases, i.e., when the illuminated section falls on both the bottom and the sidewall of the groove, in accordance with certain embodiments of the presently disclosed subject matter in such cases.

The width of the first sub-segment (corresponding to the first sub-section of the bottom illuminated section) can be measured (302) from the image. The width of the shadow section can be calculated (304) using the width of the first sub-segment and the groove width. The tread depth of the tire can be estimated (306) using the width of the shadow section and the second angle.

Figure 7:
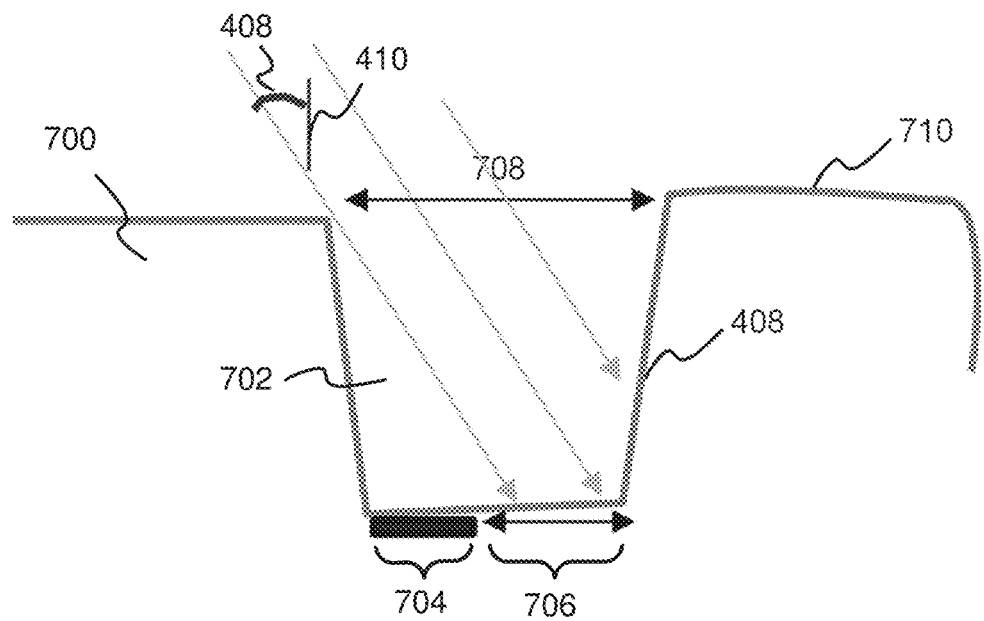
FIG. 7 illustrates schematically an example of how to estimate tread depth in accordance with certain embodiments of the presently disclosed subject matter.

Referring to FIG. 7, there is illustrated schematically an example of how to estimate tread depth in the above scenario in accordance with certain embodiments of the presently disclosed subject matter.

FIG. 7 illustrates a sectional view of a part of the tire tread 700, and a groove 702 embedded therein. The light is illuminated on the tire from the second angle 408 (as relative to the horizontal direction 410, note that the horizontal direction 410 appears vertical in the present figure due to the different perspective and the sectional view of the figure) as described above. As shown, the illuminated section falls on both the bottom of the groove and the sidewall 408 of the groove.

In accordance with the method described with reference to FIG. 3, after the image segmentation, a sub-segment 706 corresponding to the first sub-section of the illuminated section that falls on the bottom of the groove can be obtained, and the width of the sub-segment 706 can be measured from the image. The width of the groove can be obtained, e.g., by measuring a top width 708 of the groove 702 from the image. By way of example, the top width can be measured as a total width of the image segments of segments 604, 606, and 608. Alternatively, in some cases, the groove width may be obtained as part of the tire information provided by a tire manufacturer. The tire information of tire model and manufacturer can be recognized by reading the tire markings from the side of the tire using the side camera 420 as illustrated in FIG. 4. The width $W_{shadow}$ of the shadow section 704 can be obtained by subtracting the width of the sub-segment 706 from the top width 708 (assuming the top width and the bottom width of the groove 702 are substantially similar). Thus the tread depth D, which is the vertical distance between the surface of the tread 710 and the bottom of the groove, can be estimated as $D=W_{shadow}/\tan(\text{second angle } 408)$.

Alternatively, the width of the sidewall illuminated section $W_{sidewall}$ (e.g., width of segment 608 as illustrated in FIG. 6) can be measured, and the tread depth D can be calculated based on $W_{sidewall}$ and the first angle (i.e., the imaging angle), e.g., $D=W_{sidewall}/\sin(\text{first angle})$.

It is to be noted that the measurements as described in the present disclosure, such as the widths of different sections, refer to widths in units of length, such as, e.g., millimeter, centimeters, etc. In some cases, the original measurements as obtained from the image may be in the unit of pixels, and these measurements can be converted to measurements in units of length by using a calibration factor converting from pixels to millimeters.

In some embodiments, the illuminated section in some cases can fall only on the sidewall of the groove (e.g., in case where the groove is very narrow and/or deep). In such cases, since there is no illuminated section on the bottom of the groove, it is impossible to estimate the tread depth using the above described method. However, a range of the tread depth can still be determined (310) based on the groove width and the second angle.

Figure 8:
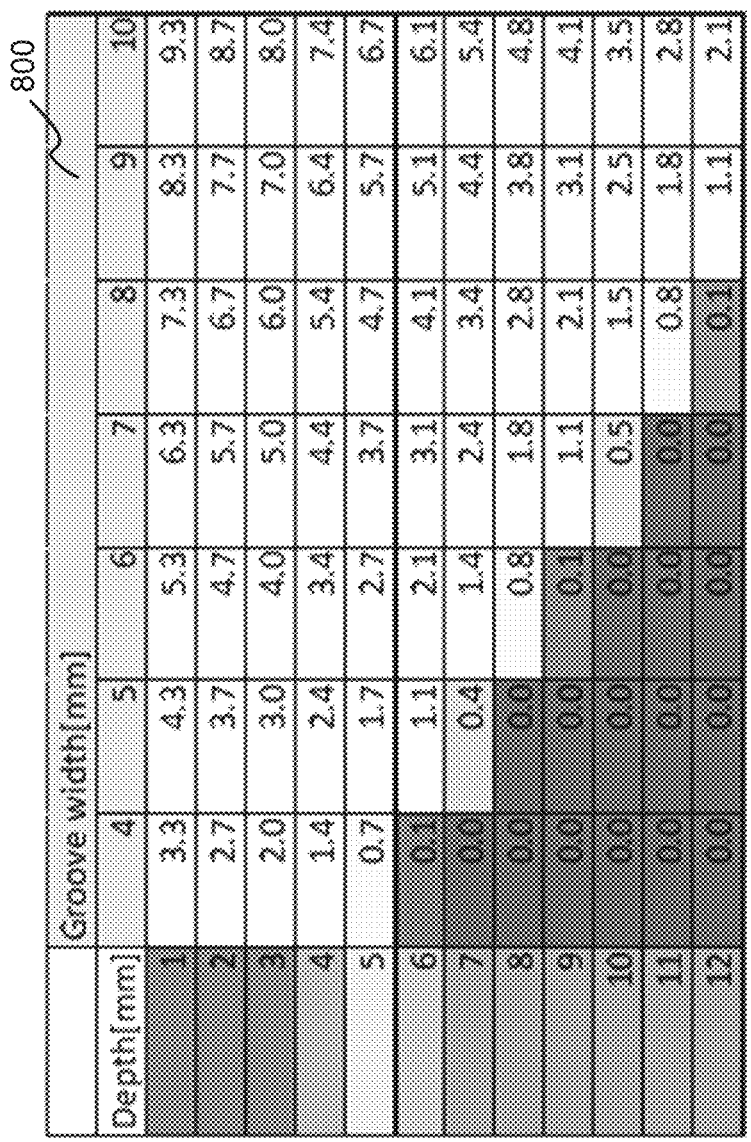
FIG. 8 illustrates a table exemplifying correlation between different groove widths and estimated tread depths in accordance with certain embodiments of the presently disclosed subject matter.

Referring now to FIG. 8, there is illustrated a table exemplifying correlation between different groove widths and estimated tread depths in accordance with certain embodiments of the presently disclosed subject matter.

Table 800 illustrates at a given illumination angle, for different tires that have different groove widths (e.g., 4-10 mm as illustrated), and different tread depths (e.g., 1-12 mm), the width of the illuminated section at the bottom of the groove. By way of example, for a tire that has a groove width of 10 mm (see the last column of the table), using the estimation method described with reference to FIG. 3, a correlation between the width of the bottom illuminated section and the tread depth can be established. For instance, when the width of the bottom illuminated section is measured as 9.3 mm, the tread depth is estimated as 1 mm, whereas when the width of the bottom illuminated section is measured as 2.1 mm, the tread depth is estimated as 12 mm. As shown, for a tire with a fixed groove width, the smaller the bottom illuminated section, the deeper the tread.

From the other perspective, when the groove width becomes smaller (i.e., the groove is narrower), it also limits the size of the illuminated section that can be seen at the bottom of the groove. By way of example, for a tire that has a groove width of 4 mm (see the second column of the table), when the width of the bottom illuminated section is measured as 3.3 mm, the tread depth is estimated as 1 mm, whereas when the bottom illuminated section becomes 0.1 mm or even disappears from the image (i.e., 0 mm), the tread depth is estimated as 6 mm, or 7 mm and above. This means that for a tire with a relatively narrow groove width, in some cases, the light is only illuminated on the sidewall and the entire groove bottom is shaded without illumination when the tread depth is above a certain threshold. In such cases, although it is not possible to estimate the depth value of the tread using the above described method with reference to FIG. 3, the range of the depth can still be derived using the table 800. For instance, for a tire with a groove width of 4 mm, in cases where the illuminated section falls entirely on the sidewall of the groove, it can be determined that the tread depth is not smaller than 7 mm. Similarly, for a tire with a groove width of 6 mm, it can be determined that the tread depth is not smaller than 10 mm when the illuminated section falls entirely on the sidewall.

It is to be understood that table 800 is derived corresponding to a specific illumination angle. For different illumination angles as configured in different system setups, respective tables can be derived similarly, using the estimation method above.

Therefore, in cases where the illuminated section falls only on the sidewall of the groove, a range of the tread depth (e.g., a minimal tread depth) can be determined using such correlation tables based on the groove width of the tire and the illumination angle.

According to certain embodiments, the second angle can be specifically configured to adapt to different tire characteristics including different groove widths and/or tire locations on the inspection lane so as to be able to provide estimation for tread depth in a predefined depth range for different tires. Tire locations refer to the position of the tires with respect to the inspection lane, e.g., at the center, to the left, or to the right. The predefined depth range can be determined differently, e.g., according to different legal requirements and/or recommendations. For instance, as aforementioned, the US legal limit for tire tread depth is about 1.6 millimeters (2/32 inches). In some places it is recommended to have a minimum tread depth of 3 millimeters for summer tires, and at least 4 millimeters (5/32 inches) for winter tires. Therefore, for safety reasons, a critical depth range of 3-5 mm can be predetermined, and the illumination angle can be specifically set so as to be able to always estimate the tread depth within the critical range for various tires. For instance, with the specific illumination angle used to derive table 800, it can be seen that for different tires that have various groove widths ranging between 4-10 mm, the tread depth in the critical range of 3-5 mm can always be estimated/calculated using the method described with reference to FIG. 3.

In some cases, once the system 100 configuration (e.g., the layout of the imaging device and the illumination device, and the first and second angles as nominally configured, etc.) is specifically defined, the actual position of a tire to be inspected is still variable. This is due to the fact that vehicles driving through the system in some cases will not be perfectly positioned on the inspection lane (e.g., at the center of the inspection lane). In addition, the vehicles may have different vehicle widths. Therefore, even if the vehicles are centered on the lane, the relative positions and the distances between the vehicles and the imaging device are still different. Such variation in tire position can cause the actual first and second angles to be different from the nominal configured angles. The actual angles can be inferred from the location of the tire in the image. For example, a tire centered in the image can be inferred to have the nominal angles, while a tire on the far side of the image can be inferred to have larger angles and vice versa. A calibration between different locations of the tire in the image, and the respective angles corresponding thereto, can be performed. Therefore, the actual angles in an image can be obtained, e.g., by measuring the location of the tire in the image and performing a correction to the nominal angles based on the calibration.

Once the tread depth is estimated (208) as described above, the estimated tread depth can be compared with a predefined criterion, such as, e.g., a legal limit, a predefined range, etc., and it can be determined whether to replace the tire based on the comparison result.

In some embodiments, the image as acquired can be informative of one or more tires (such as e.g., the image 502 illustrated in FIG. 5). The PMC can be further configured to extract one or more sub-images corresponding to the one or more tires, and perform the segmentation and tread depth estimation as described above with reference to FIG. 2 on each of the one or more sub-images.

In some embodiments, the image as acquired (such as the images 502 or 504) can be split into a plurality of image patches (such as the image patch 600) corresponding to a plurality of measurement locations of a given groove (e.g., different locations along the curved surface of the tire tread/groove) and/or of different grooves, and the image segmentation and the estimation as described above can be performed for each image patch so as to obtain depth estimation for different locations of the tread.

Figure 10A:
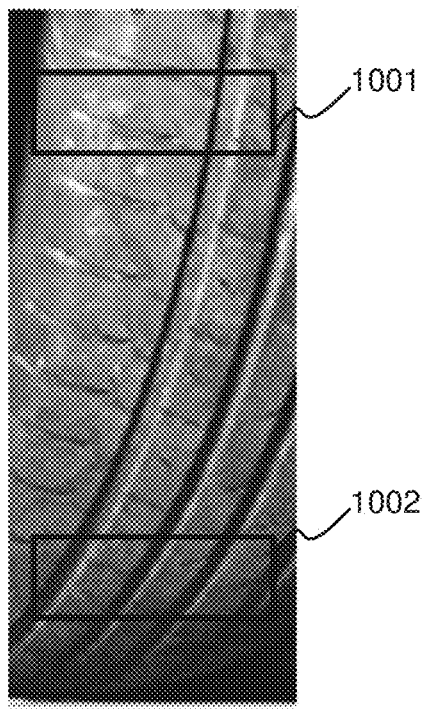
FIG. 10A illustrates examples of image patches extracted from different locations of a tire image in accordance with certain embodiments of the presently disclosed subject matter.

It is to be noted that the first and second angles used herein in some embodiments are defined on a horizontal plane that the tire center, the illumination device and the imaging device reside on. FIG. 10A illustrates an example of an image patch 1001 extracted from a tire image that is along the horizontal plane with respect to the illumination device, the imaging device and center of the tire. However, there are a plurality of three-dimensional (3D) angles (as these angles are not defined on the horizontal plane, but in a 3D space between the measurement points and the devices) on the curved surface of the tire tread. These additional angles can provide additional measurement locations/points for improving the measurements. For instance, e.g., image patches can be extracted at different locations of the tire image and used for tread depth estimation. In some cases, when moving to the lower (or upper) part of the tire as relative to the horizontal plane, there is always a location where, due to the 3D angle of incidence, the shadow section extends further until the width of the bottom illumination section is reduced to zero, as exemplified in the image patch 1002 at the bottom of FIG. 10A. Such a measurement point (as well as additional measurement points) can be used for a robust measurement of the groove depth. For instance, the measurements from different measurement points should be substantially consistent and in agreement with each other. The 3D angles can be calculated, for example, by performing a correction on the first and second angles, based on the relative position of the measurement point with respect to the horizontal plane, and the tire radius.

For instance, for at least a second image patch that is above or below the horizontal plane, the PMC can be configured for obtaining a 3D second angle corresponding to a measurement location in the second image patch, and performing the segmentation and estimation on the second image patch using the 3D second angle. The 3D second angle can be obtained as described above, e.g., by performing a correction on the second angle based on a relative position of the measurement location with respect to the horizontal plane, and radius of the tire.

Figure 10B:
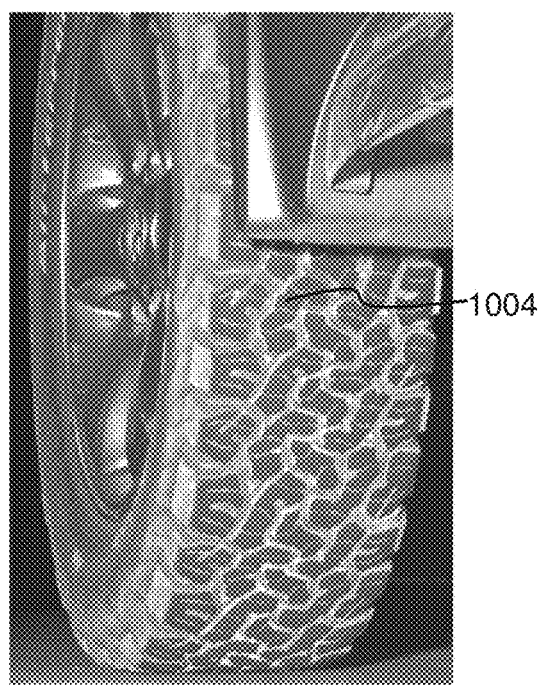
FIG. 10B illustrates an example of a tire which has tread and grooves in a direction that is not parallel to the circumference of the tire in accordance with certain embodiments of the presently disclosed subject matter.

In some embodiments, the 3D angles as described above can be used to measure tread depth on tires where at least part of the tread and grooves are in a direction that is not parallel to the circumference of the tire, as exemplified in FIG. 10B in accordance with certain embodiments of the presently disclosed subject matter. As exemplified, the tread 1004 (and the groove next thereto) has an orientation which is not parallel to the circumference of the tire. The illumination angle used for estimating the tread depth of such tread can be estimated as a 3D angle relative to the direction of the tread and the illumination device.

In some embodiments, when the tire is a rotating tire on a moving vehicle, the PMC can be configured to obtain a sequence of images of the tire during a relative movement between the tire and the imaging device, and the segmentation and the estimation can be performed on at least some of the sequence of images so as to obtain estimated tread depth covering the range of the circumference of the tire (or at least part thereof). By way of example, the sequence of images can be sampled based on a given frequency so that the sampled images can cover the range of the circumference of the tire.

Figure 9:
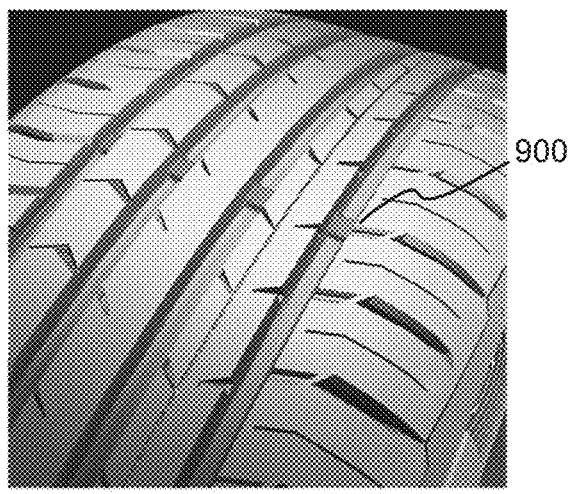
FIG. 9 illustrates a tire with tread wear bars spaced through the grooves in accordance with certain embodiments of the presently disclosed subject matter.

According to certain embodiments, tread wear condition can also be estimated using tread wear indicators, or wear bars. The wear bars appear as flat rubber bars that are spaced evenly through the main grooves in the tire tread. When the wear bars are flush with the level of the tread surface, it is an indication that the tire should be replaced. FIG. 9 illustrates a tire with tread wear bars 900 spaced through the grooves in accordance with certain embodiments of the presently disclosed subject matter.

The wear bars are normally examined manually to check if they are flush with the level of the tread surface. According to certain embodiments of the present disclosure, the depth estimation methods as described with reference to FIGS. 2 and 3 can be applied similarly to automatically estimate the depth of the wear bars. Specifically, a tire image informative of tread wear bars can be segmented using the image segmentation as described above, and the estimation method can be similarly applied, where the bottom of the groove should be replaced by the surface of the wear bars. For instance, using the illustration in FIG. 7 as an example, assuming there is a wear bar embedded in the groove 702, thus the shadow section 704 and the illuminated section 706 would fall on the surface of the wear bar, and the rest of the estimation can be similarly applied in accordance with FIG. 3 so as to derive the depth of the wear bar, thereby providing an indication of the tread wear condition.

It is to be noted that for the purpose of estimating tread wear condition, in some embodiments, the estimation of the depth of tread wear bars as described above can be performed in addition to the estimation of tread depth, whereas in some other embodiments, the estimation of the depth of tread wear bars can be performed separately and in lieu of the estimation of tread depth.

It is appreciated that the examples and embodiments illustrated with reference to the tread depth estimation system in the present description are by no means inclusive of all possible alternatives but are intended to illustrate non-limiting examples only.

It is to be understood that the present disclosure is not limited in its application to the details set forth in the description contained herein or illustrated in the drawings. The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer readable memory or storage medium tangibly embodying a program of instructions executable by the computer for executing the method of the present disclosure.

The non-transitory computer readable storage medium causing a processor to carry out aspects of the present disclosure can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the present disclosure as hereinbefore described without departing from its scope, defined in and by the appended claims.

The invention claimed is:

1. A computerized system of estimating tread depth of a tire, the system comprising a processing and memory circuitry (PMC) configured for:
   obtaining, from an imaging device, an image of the tire positioned on an inspection lane, the image informative of tread of the tire and one or more grooves embedded therein, wherein the imaging device is positioned on at least one side of the inspection lane, and the image is acquired by the imaging device from a first angle relative to a horizontal direction perpendicular to surface of the tread, and wherein the tire is illuminated by an illumination device from a second angle relative to the horizontal direction, causing a shadow section and an illuminated section at the bottom and/or sidewall of at least one groove, wherein the imaging device and the illumination device are positioned so as to have the first angle being smaller than the second angle, such that the image captures the illuminated section and at least part of the shadow section;
   performing segmentation on the image to obtain at least a first image segment corresponding to the illuminated section and a second image segment corresponding to the at least part of the shadow section;
   obtaining a groove width of the at least one groove; and
   estimating the tread depth based on at least the first image segment, the groove width, and the second angle.

2. The computerized system according to claim 1, wherein the first image segment indicates that the illuminated section falls entirely on the sidewall of the at least one groove, and the estimating comprises determining a range of the tread depth based on the groove width and the second angle.

3. The computerized system according to claim 1, wherein the first image segment comprises a first sub-segment corresponding to a first sub-section of the illuminated section that falls on the bottom of the at least one groove and a second sub-segment corresponding to a second sub-section of the illuminated section that falls on the sidewall of the at least one groove, and wherein the estimating comprises:
   measuring a width of the first sub-segment;
   calculating a width of the shadow section using the width of the first sub-segment and the groove width; and
   estimating the tread depth of the tire using the width of the shadow section and the second angle.

4. The computerized system according to claim 1, further comprising the imaging device and the illumination device which are positioned in proximity to each other on the at least one side of the inspection lane, wherein at least the imaging device is operatively connected to the PMC.

5. The computerized system according to claim 1, wherein the second angle is configured to adapt to different tire characteristics including different groove widths and/or tire locations on the inspection lane so as to provide estimation for tread depth in a predefined depth range for different tires.

6. The computerized system according to claim 1, wherein the PMC is further configured for comparing the tread depth with a predefined criterion and determining whether to replace the tire.

7. The computerized system according to claim 1, wherein the segmentation is performed using a segmentation learning model trained to segment a tire image in accordance with different illumination levels.

8. The computerized system according to claim 1, wherein the image is further informative of one or more tread wear bars, and the PMC is further configured for estimating depth of at least one of the tread wear bars.

9. The computerized system according to claim 1, wherein the image is informative of one or more tires, and the PMC is configured for extracting one or more sub-images corresponding to the one or more tires, and performing the segmentation and the estimation on each of the one or more sub-images.

10. The computerized system according to claim 1, wherein the tire is a rotating tire on a moving vehicle, and the PMC is configured for obtaining a sequence of images of the tire during a relative movement between the tire and the imaging device, and performing the segmentation and the estimation on at least some of the sequence of images so as to obtain estimated tread depth covering at least part of circumference of the tire.

11. The computerized system according to claim 1, wherein the image is split into a plurality of image patches corresponding to a plurality of measurement locations on the at least one groove, and the PMC is configured for performing the segmentation and estimation using the second angle for a first image patch that is along a horizontal plane with respect to the illumination device, the imaging device and center of the tire, and wherein for at least a second image patch that is above or below the horizontal plane, the PMC is configured for obtaining a 3D second angle corresponding to a measurement location in the second image patch, and performing the segmentation and estimation on the second image patch using the 3D second angle.

12. The computerized system according to claim 11, wherein the 3D second angle is obtained by performing a correction on the second angle based on a relative position of the measurement location with respect to the horizontal plane, and radius of the tire.

13. A computerized method of estimating tread depth of a tire, the method performed by a processing and memory circuitry (PMC), the method comprising:
obtaining, from an imaging device, an image of the tire positioned on an inspection lane, the image informative of tread of the tire and one or more grooves embedded therein, wherein the imaging device is positioned on at least one side of the inspection lane, and the image is acquired by the imaging device from a first angle relative to a horizontal direction perpendicular to surface of the tread, and wherein the tire is illuminated by an illumination device from a second angle relative to the horizontal direction, causing a shadow section and an illuminated section at the bottom and/or sidewall of at least one groove, wherein the imaging device and the illumination device are positioned so as to have the first angle being smaller than the second angle, such that the image captures the illuminated section and at least part of the shadow section;
performing segmentation on the image to obtain at least a first image segment corresponding to the illuminated section and a second image segment corresponding to the at least part of the shadow section;
obtaining a groove width of the at least one groove; and
estimating the tread depth based on at least the first image segment, the groove width, and the second angle.

14. The computerized method according to claim 13, wherein the first image segment indicates that the illuminated section falls entirely on the sidewall of the at least one groove, and the estimating comprises determining a range of the tread depth based on the groove width and the second angle.

15. The computerized method according to claim 13, wherein the first image segment comprises a first sub-segment corresponding to a first sub-section of the illuminated section that falls on the bottom of the at least one groove and a second sub-segment corresponding to a second sub-section of the illuminated section that falls on the sidewall of the at least one groove, and wherein the estimating comprises:
measuring a width of the first sub-segment;
calculating a width of the shadow section using the width of the first sub-segment and the groove width; and
estimating the tread depth of the tire using the width of the shadow section and the second angle.

16. The computerized method according to claim 13, wherein the second angle is configured to adapt to different tire characteristics including different groove widths and/or tire locations on the inspection lane so as to provide estimation for tread depth in a predefined depth range for different tires.

17. The computerized method according to claim 13, wherein the image is further informative of one or more tread wear bars, and the method further comprises estimating depth of at least one of the tread wear bars.

18. The computerized method according to claim 13, wherein the image is informative of one or more tires, and the method comprises extracting one or more sub-images corresponding to the one or more tires, and performing the segmentation and estimation on each of the one or more sub-images.

19. The computerized method according to claim 13, wherein the tire is a rotating tire on a moving vehicle, and the method comprises obtaining a sequence of images of the tire during a relative movement between the tire and the imaging device, and performing the segmentation and the estimation on at least some of the sequence of images so as to obtain estimated tread depth covering at least part of circumference of the tire.

20. A non-transitory computer readable storage medium tangibly embodying a program of instructions that, when executed by a computer, cause the computer to perform a method of estimating tread depth of a tire, the method comprising:
obtaining, from an imaging device, an image of the tire positioned on an inspection lane, the image informative of tread of the tire and one or more grooves embedded therein, wherein the imaging device is positioned on at least one side of the inspection lane, and the image is acquired by the imaging device from a first angle relative to a horizontal direction perpendicular to surface of the tread, and wherein the tire is illuminated by an illumination device from a second angle relative to the horizontal direction, causing a shadow section and an illuminated section at the bottom and/or sidewall of at least one groove, wherein the imaging device and the illumination device are positioned so as to have the first angle being smaller than the second angle, such that the image captures the illuminated section and at least part of the shadow section;

performing segmentation on the image to obtain at least a first image segment corresponding to the illuminated section and a second image segment corresponding to the at least part of the shadow section;

obtaining a groove width of the at least one groove; and estimating the tread depth based on at least the first image segment, the groove width, and the second angle.

\* \* \* \* \*